US006924574B2

(12) United States Patent
Qu et al.

(10) Patent No.: US 6,924,574 B2
(45) Date of Patent: Aug. 2, 2005

(54) DUAL-ROTOR, RADIAL-FLUX, TOROIDALLY-WOUND, PERMANENT-MAGNET MACHINE

(75) Inventors: Ronghai Qu, Clifton Park, NY (US); Thomas A. Lipo, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/449,338

(22) Filed: May 30, 2003

(65) Prior Publication Data

US 2004/0239199 A1 Dec. 2, 2004

(51) Int. Cl.$^7$ .............................................. H02K 16/00
(52) U.S. Cl. ......................... 310/114; 310/112; 310/51
(58) Field of Search ..................... 310/112–114, 156.01, 310/254, 216, 261, 51

(56) References Cited

U.S. PATENT DOCUMENTS

| | | | |
|---|---|---|---|
| 4,087,711 A | | 5/1978 | Kirtley, Jr. et al. |
| 5,304,882 A | | 4/1994 | Lipo et al. |
| 5,376,851 A | | 12/1994 | Lipo et al. |
| 5,455,473 A | | 10/1995 | Lipo et al. |
| 5,672,925 A | | 9/1997 | Lipo et al. |
| 5,825,112 A | | 10/1998 | Lipo et al. |
| 5,825,113 A | | 10/1998 | Lipo et al. |
| 5,942,828 A | | 8/1999 | Hill |
| 6,002,192 A | * | 12/1999 | Krivospitski et al. ....... 310/266 |
| 6,043,579 A | | 3/2000 | Hill |
| 6,114,784 A | * | 9/2000 | Nakano ........................ 310/59 |
| 6,445,105 B1 | | 9/2002 | Kliman et al. |
| 6,590,312 B1 | | 7/2003 | Seguchi et al. |
| 2002/0067091 A1 | | 6/2002 | Kliman et al. |
| 2002/0113520 A1 | | 8/2002 | Kastinger et al. |
| 2003/0189386 A1 | | 10/2003 | Carl |

FOREIGN PATENT DOCUMENTS

EP 0677914 B1 6/1995

OTHER PUBLICATIONS

T. A. Lipo, Recent Progress in the Development of Solid–State AC Motor Drives, IEEE Transaction on Power Electronics, vol. 3, No. 2, Apr. 1988, pp. 105–117.
B. K. Bose, Power Electronics and Motion Control–Technology Status and Recent Trends, IEEE Transaction on Industry Applications. vol. IA–29, No. 5, Sep./Oct. 1993, pp. 902–909.
T. A. Lipo & F. X. Wang, Design & Performance of Converter Optimized AC Machines, IEEE Transactions on Industry Applications, vol. IA–20, No. 4, Jul./Aug. 1984, pp. 834–844.
T. A. Lipo, Synchronous Reluctance Motor–A Viable Alternative for Adjustable Speed Drive? Electric Machines & Power Systems, Sep., 1991.
P.J. Jansen, R.D. Lorenze & D.W. Novotny, Observer Based Direct Field Orientation: Anal.& Comp. of Alter. Method, IEEE Trans. on Ind. Appl. vol. 30, #4 Jul./Aug. 1994 pp. 945–953.
T.J.E. Miller, T.W.Newmann, & E. Richter, A Permanent Magnet Excited High Efficiency Sync. Motor w/Line–start Cap., IEEE Ind. Appl. Soc. Conf. Rec. 1983, pp. 455–461.

(Continued)

*Primary Examiner*—Thanh Lam
(74) *Attorney, Agent, or Firm*—Godfrey & Kahn, S.C.

(57) ABSTRACT

The present invention provides a novel dual-rotor, radial-flux, toroidally-wound, permanent-magnet machine. The present invention improves electrical machine torque density and efficiency. At least one concentric surface-mounted permanent magnet dual-rotor is located inside and outside of a torus-shaped stator with back-to-back windings, respectively. The machine substantially improves machine efficiency by reducing the end windings and boosts the torque density by at least doubling the air gap and optimizing the machine aspect ratio.

39 Claims, 12 Drawing Sheets

OTHER PUBLICATIONS

T.M. Jahns, G.B. Kilman, & T.W. Newmann, Interior Permanent–Magnet Sync. Motors for Adjustable–speed Dr., IEEE Trans. on Ind. Appl. vol. IA–22, #4 Jul./Aug. 1986, pp. 738–747.

P. Zimmerman, Electrically Commutated dc Feed Drives for Machine Tools, Drive Contr. Int. vol. 2, Oct./Nov. 1982, pp. 13–20.

T.W. Newmann & R.E. Tompkins, Line Start Motors Designed w/Nd–Fe–B Permanent Magnets, in Proc. 8th Int. Workshop on Rare Earth Magnets, 1985 pp. 77–89.

T.M. Jahns. Torque production in permanent–magnet synchronous motor drives with rectangular current excitation, IEEE Transaction on Ind.Appl. vol. 20, #4, pp. 803–813, Jul./Aug. 1984.

F. Blaschke, The Principle of Field Orientation as Applied to New Transvector Closed Loop Control for Rotating–field Machine, Siemens Review, 1972, vol. 39, No. 5, pp. 217–220.

J.C. Moreira, K.T. Hung, T.A. Lipo, & R.D. Lorenz, A Smpl. & Robust Adapt. Cont. for Det. Corr. in Fld. Ort. Induc. Mach., IEEE Trans on Ind.Appl.vol.28 #6 Nov./Dec. 1992 p. 1359–1366.

P.L. Jansen & R.D. Lorenz, Transducerless Position & Velocity Estimation in Induction & Salient AC Mach., IEEE Ind. Appl. Soc. Conf. Rec., Oct. 1994 pp. 240–247.

M.W. Degner & R.D. Lorenz, Using Mult. Saliency for the Estimation of Flux, Position & Velocity in AC Mach., IEEE Ind. Appl. Soc. Conf. Rec., New Orleans, Oct., 1997, pp. 760–767.

M.D. Manjrekar, T.A. Lipo, S.Chang & K. Kim, Flux Tracking Methods for Direct Field Orientation, Int. Conf. on Electrical Machines, Turkey, Sep. 1998 pp. 1022–1029.

R.D. Lorenz, T.A. Lipo & D.W. Novotny, Motion Control with Induction Motors, IEEE Proc. Special Issue on Power Electronics & Motion Control, Aug. 1994 pp. 1215–1250.

P.J. Lawrenson, J.M. Stephenson, P.T. Blenkinsop, J. Corda & N.N. Fulton, Variable Speed Switched Reluctance Motors, IEEE Proc. vol. 127,Pt. B., No. 4, Jul. 1980 pp. 253–265.

W.F. Ray, P.J. Lawrenson, R.M. Davis, J.M. Stepheson, N.N. Fulton & R.J. Black, High Perfor. Swt. Reluct. Brushless Dr., IEEE Trans. on Ind. Appl., vol. IA–22, #4,1986,pp. 722–730.

M.R. Harris, J.W. Finch, J.A. Malick, T.J.E. Miller, A Review of the Integral Horsepower Switched Reluctance Drives, IEEE Trans. on Ind. Appl., vol. IA–22, No. 4, 1986,pp. 716–721.

T.J.E. Miller, Converter Volt–ampere Requirements of the Switched Reluctance Motor Drive, IEEE Trans. on Ind. Appl., vol. IA–21, No. 5, 1985 pp. 1136–1144.

Harva, V. Blasco & T.A. Lipo, A Modified C–dump Circuit for Variable Reluctance Machines, IEEE Ind. Appl. Soc., Conf. Rec., 1991, pp. 886–891.

T.A. Lipo & J.C. Moreira, Simulation of a Four Phase Switched Reluctance Motor Including the Effects of Mutual Coupl., Electric Mach. & Power System, vol. 16, 1989, pp. 281–299.

R. Qu and R. Yao, Variable Structure Control & Simulation of an SRM Drive, Journal of Tsinghua University, vol. 37, No. 4, 1997, pp. 11–13.

M.S. Islam, H. Iqbal, Torque–ripple Minimization w/Indirect Position & Speed Sensing for Switched Reluct. Motors, IEEE Trans. on Ind. Elctr., vol. 47 #5, Oct. 2000, p.1126–1133.

L. Venkatesha & V. Ramanarayana, Comp. Study of Pre–comp. Curr. Meth. for Torque Ripple Mini in Switched Reluct. Mot., IEEE Ind. Apl. Soc. Conf., Rec., 2000 vol. 1, pp. 119–125.

D. Qin, X. Luo, and T.A. Lipo, Reluctance Motor Control for Fault–Tolerant Capability, the invited paper for IEEE IEMDC '97, Milwaukee, WI.

Y.F. Liao, F. Liang and T.A. Lipo, A Novel Permenant Magnet Motor with Doubly Salient Structure, IEEE Ind. Appl. Soc., Conf. Rec., vol. 1, pp. 308–316, 1992.

A. Shakal, Y.F. Liao and T.A. Lipo, A Permanent Magnet Motor with True Field Weakening, IEEE Int. Symposium on Industrial Electronics, Budapest, Hungary, Jun. 1993 pp. 19–24.

Y. Liao, and T.A. Lipo, Sizing and Optimal Design of Doubly Salient Permanent Magnet Motors, IEEE 6th Int. Conf. on Electrical Mach. & Dr., Sep. 8–10, 1993 pp 452–456.

Y. Liao, and T.A. Lipo, A New Doubly Salient Permanent Magnet Motor for Adjustable Speed Drives, SPEEDAM, Positano, Italy, 1992.

F. Caricchi, F. Crescimbini, and O. Honorati, Low–cost Compact Machine for Adjustable—Speed Pump Application, IEEE Trans. on Ind. Appl., vol. 34, No. 1, Jan./Feb. 1998 pp. 109–116.

F. Caricchi, F. Crescimbini, A.D. Napoli & M. Marcheggiani, Prot. of Electric Vehicle Dr. w/Twin Water–cooled Whl. Dir. Dr. Mts., IEEE PESC, Baveno,Italy,1996 pt.2, pp1926–1932.

F. Caricchi, F. Crescimbini, E. Fedli and G. Noia, Dsgn & Constr. of a Wheel Directly Coupl. Axial Flux PM Motor Prot for Evs, IEEE Ind. Appl. Soc., Conf.Rec., Denver,CO, Oct., 1994, pp. 254–261.

F.Caricchi, F.Crescimbini, E. Santini & C. Santucci, Influence of the Radial Var. of the Magnet Pitch in Slotless Permanent magents Axial Flux Motors, IEEE Ind. Appl. Soc., Conf. Rec., New Orleans, Louisiana, Oct., 1997, pp. 18–23.

G. Jack, B.C. Mecrow, P.G. Dickinson, D.Stephenson, J.S. Burdess, J.N. Fawcett, & T. Evans, Permt. Magnet Machines with Powdered Iron Cores and Pre–pressed Windings, IEEE Ind. Appl., Soc., Conf. Rec., 1999, Phoenix, AZ, vol. 1, pp. 97–103.

M. Persson, P. Jansson, A.G. Jack and B.C. Mecrow, Soft Magnetic Composite Materials–Use for Elect. Machines, Seven Intl. Conf. on Elect. Machines & Dr., IEEE Conf. Publ. #412, Durham, UK., Sep. 1995, pp. 242–246.

F. Profumo, A. Tenconi, Z.Zhang, & A. Cavagnino, Novel Axial Flux Interior PM Synch Motor Realized w/Powdered Soft Magnetic Materials, IEEE Ind. Appl. Soc., Conf.Rec. 1998, St. Louis, MO, vol. 1, pp. 152–158.

S. Huang, J. Luo, F.Leonardi, & T.A. Lipo, A general Approach to Sizing & Power Density Equations for Comp. of Electr. Machines, IEEE Trans. on Ind. Appl. vol. 34, #1, Jan./Feb., 1998, pp. 92–97.

S. Huang, J. Luo, F. Leonardi & T.A. Lipo, Comp. of Power Density for Axial Flux Machines Based on General Purpose Sizing Equations, IEEE Tran. on Energy Conv., vol. 14 #2, 1999, pp. 185–192.

S. Huang J. Luo, & T.A. Lipo, Eval. of the Transv. Flux Circumferential Current Machine by the Use of Sizing Equations, IEEE Inter. Electric Machines & Drives Conf., IEMDC, Milwaukee, WI, 1997, pp. 15.1–15.3.

V.B. Honsinger, Sizing Equations for Electrical Machinery, IEEE Transactions on Energy Conversion, vol. EC–2, No. 1, Mar. 1987, pp. 116–121.

W. Tsai, & T. Chang, Analysis of Flux Leakage in a Brushless Permanent Magnet Motor with Embedded Magnets, IEEE Trans. on Magnetics, vol. 35 #1, Jan. 1999, pp. 543–547.

J. Reinert, A. Brockmeyer, R.W. De–Doncker, Calcul. of Losses in Ferro and Ferrimagnetic Materials Based on the Modified Steinmetz Equation, IEEE Ind. Appl. Soc. Conf. Rec., 1999, Phoenix, AZ, Oct. vol. 3, pp. 2087–2092.

N. Bianchi, S. Bolognani, Dsgn. Techniq. for Reducing the Cogging Torque in Surface–Mounted PM Motors, IEEE Ind. Appl. Soc., Conf. Rec., 2000, Piscataway, NJ, vol. 1 pp. 179–185.

T.M. Jahns & W.L. Soong, Pulsating Torque Minimization Technique for Permanent Magnet AC Motor Drives–A Review, IEEE Trans. on IE, vol. 43, #2 pp. 321–330, 1996.

M. Goto & K. Kobayashi, An Analysis of the Cogging Torque of a DC Motor & A New Technique of Reducing the Cogging Torque, Elec. Eng. Jpn, vol. 103, #5 pp. 113–120, 1983.

K. Kobayashi & M. Goto, A Brushless DC Motor of a New Structure with Reduced Torque Fluctuations, Elec. Eng. Jpn, vol. 105, No. 3, pp. 104–112, 1985.

T. Li and G. Slemon, Reduction of Cogging Torque in Permanent Magnet Motors, IEEE Trans. on MAG, vol. 24, No. 6, pp. 2901–2903, 1988.

Z.Q. Zhu & D. Howe, Analytical Prediction of Cogging Torque in Radial–field Permanent Magnet Brushless Motors, IEEE Trans. on MAG, vol. 28, No. 2, pp. 1371–1374, 1991.

T. Ishikawa & G. Slemon, A Method to Reduce Rripple Torque in Permanent Magnet Motors without Skewing, IEEE Trans. on MAG, vol. 29, No. 2, pp. 2028–2031, 1993.

R.P. Deodhar, D.A. Staton, T.M. Jahns & T.J.E. Miller, Prediction of Cogging Torque Using Flux–mmf Diagram Technique, IEEE Trans. on IA, vol. 32, No. 3, pp. 569–575, 1996.

Keyhani, C.B. Studer, T. Sebastian, & S.K. Murthy, Study of Cogging Torque in Permanent Magnet Machines, Electric Machines and Power Systems, vol. 27, No. 7, 1999, pp. 665–678.

S. Chen, A. Song, T. Sekiguchi, High Efficiency and Low Torque Ripple Control of Permanent Magnet Synchr. Motor Based on the Current Tracking Vector of Electromotive Force, IEEE Ind. Appl. Soc., Conf. Rec., 2000, Piscataway, NJ, vol. 3, pp. 1725–1729.

V. Petrovic R. Ortega A.M. Stankovic G. Tadmor Design and Imlementation of and Adaptive Controller for Torque Ripple Minimization in PM Synchronous Motors, IEEE Trans. on PE, vol. 15, #5, pp. 871–880, Sep. 2000.

Lam, S. Panda, & J. Xu, Torque Ripple Minimization in PM Synchronous Motors an Iterative Learning Control Approach, Proceedings of the Int. Conf. on Power Electronics & Drive Systems, vol. 1, pp. 144–149, 1999.

P. Zhou, M.A. Rahman, & M.A. Jabbar, Field Circuit Analysis of Permanent Magnet Synchronous Motors, IEEE Trans. on Magnets, vol. 30, #4, Jul. 1994, pp. 1350–1359.

M. M. EL Missiry, Theory and Performance of Double–Stator Hollow Rotor Motor, IEEE Ind. Appl. Soc., Conf. Rec., Atlanta, GA, vol. 1, pp. 760–767.

A. Toba, T.A. Lipo, Novel Dual–Excitation Permanent Magnet Vernier Machine, IEEE Ind. Appl. Soc., Conf. Rec., 1999, Phoenix AZ, vol. 4, pp. 2539–2544.

X. Luo, D.Quin, T.A. Lipo, A Novel Two Phase Doubly Salient Permanent Magnet Motor, IEEE Ind. Appl. Soc., Conf. Rec., San Diego, CA, 1996, vol. 2, pp. 808–815.

D.H. Kelly, Double–Rotor Induction Motor, IEEE Trans. on Power Apparatus and Systems, vol. PAS–88, No. 7, Jul. 1969, pp. 1086–1092.

M.M. Steeves, J.L. Kirtley, Toroidal Winding Geometry for High Voltage Superconducting Alternators, IEEE Trans. on Power Apparatus and Systems, vol. PAS–93,#6, Nov.–Dec. 1974, pp. 1902–1906.

P.L. Chapman, S.D. Sudhoff, C.A. Whitcomb, Optimal Current Control Strategies for Surf–Mounted Permanent–Magnet Synch. Mach. Dr., IEEE Tran. on Engy Conv. vol. 14, #4, pp. 1043–1050, Dec. 1999.

C.W. Oliver, Super–Synchronous Motors, Power Engineer, vol. 23, No. 268, Jul. 1928, pp. 269–271, London, Monthly.

* cited by examiner

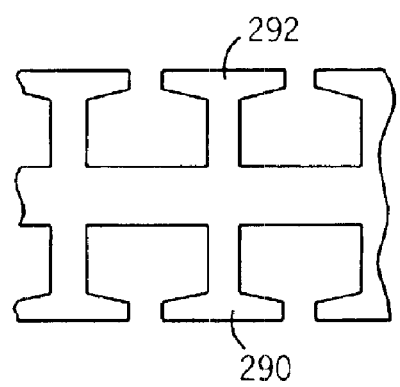
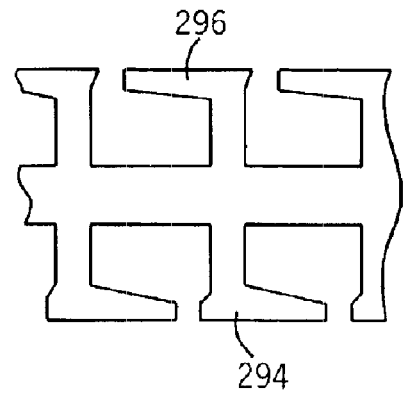
FIG. 12A       FIG. 12B
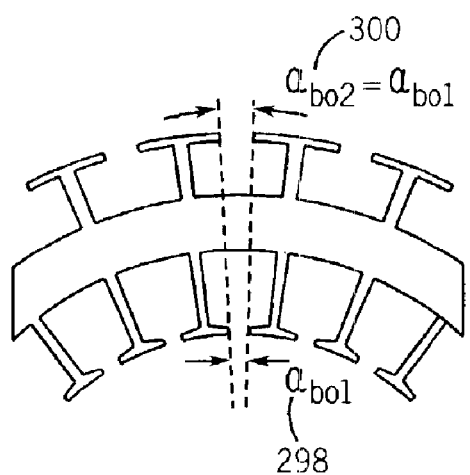
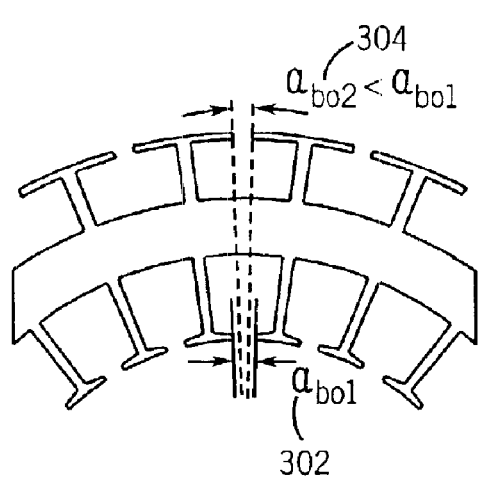
FIG. 13A       FIG. 13B

DUAL-ROTOR, RADIAL-FLUX, TOROIDALLY-WOUND, PERMANENT-MAGNET MACHINE

STATEMENT REGARDING FEDERALLY SPONSORED RESEARCH OR DEVELOPMENT

This invention was made with United States Government support awarded by the Department of Energy (DOE), Grant No. DE-AC36-99-GO10337. The United States Government has certain rights in this invention.

BACKGROUND OF THE INVENTION

The present invention relates generally to electrical machines, and more particularly to a dual-rotor, radial-flux, toroidally-wound, permanent magnet machine.

Electrical machines that transform mechanical energy into electrical energy have been studied, designed and utilized for over a century. Today, electrical machines are widely used in every aspect of human life. Electrical machines may take the form of DC motors or AC motors. DC motors have been in use for a long time due to their high performance in motion and drive applications. With the development of power electronics, new control technology and machine topologies, great progress has been made to replace DC machines in the adjustable speed area with AC motors to obtain better performance, reliability, improved maintenance characteristics, and lower costs. Extensive research and development has gone into developing AC machines that are suitable for drive applications and still match the characteristics of solid state power converters.

AC motors are designed for use with either polyphase or single-phase power systems. AC motors are typically divided into series, synchronous, and induction motors. Induction motors, single-phase or polyphase, the most commonly used type of AC motor, derives its name from the fact that AC voltages are induced in a rotor circuit by a rotating magnetic field of a stator.

Currently, induction machines are the dominant choice for both constant speed and variable speed drives due to the absence of brushes and slip rings. However, induction machines have their drawbacks. Rotor windings are present in all induction machines, rotor current produces rotor resistive losses, decreasing the efficiency of the motor, particularly at low power ratings, and cause cooling problems. Given the excitation penalty of induction machines, permanent magnet machines, in which the air gap flux is established by magnets, have been given attention ever since the Alnico magnet was developed by Bell Laboratories in the 1930's.

With the advent of increased interest in power electronics, Converter Fed Machines (CFM) have been one of the focuses of research and development of electrical machines. Some of the CFMs that have attracted interest include Brushless DC machines (BLDC), Switched Reluctance Machines (SRM), Synchronous Reluctance machines (SynRM), Double Salient Permanent Magnet machines (DSPM), Axial Flux Toroidal Permanent Magnet machines (AFTPM), and Axial Flux Circumferential Current machines (AFCC). However, these all have their own drawbacks and disadvantages.

High torque density and high efficiency are two of the most desirable features for an electrical machine. Improvement of these features have been being one of the main aspects of research on electrical machines in the last couple of decades. The goal of the present invention is to provide an electrical machine having high torque density and high efficiency. Several new topologies have been proposed with improved torque density and efficiency. However, rare earth magnets, i.e., Neodymium Iron Boron (NdFeB), were used in these topologies to keep the efficiency high and achieve the high air gap flux density and high torque density, which causes high material cost. In addition, some topologies are restricted in low speed applications since the losses increase as the speed increases.

Development of a machine topology suitable for moderately high or high speed with high torque density and high efficiency simultaneously using such low cost materials as ferrite magnets is the goal of this invention.

The present invention provides a solution to the above problems by providing a dual-rotor, radial-flux, toroidally-wound, permanent magnet machine that is superior to existing technology because it makes electrical machines having a higher torque density and higher efficiency, so that less materials, smaller volume, lighter mass, and less cost are needed to provide the same output power.

SUMMARY OF THE INVENTION

The present invention relates to a novel machine family of dual-rotor, radial-flux, toroidally-wound, permanent-magnet machines. The dual-rotor, radial-flux machines of the present invention can possess a variety of embodiments based on different structure of the windings, slots, and magnet arrangements. The dual-rotor, radial-flux, toroidally-wound, surface-mounted permanent-magnet machines of the present invention achieve a high torque density, high efficiency and the low machine cost.

An embodiment of a dual-rotor, radial-flux, toriodally-wound, surface-mounted, permanent magnet machine preferably includes at least one stator and at least one permanent magnet rotor having inner and outer working surfaces which form at least two air gaps when the stator is inserted between the inner and outer working surfaces of the rotor comprising a rotor-stator-rotor structure. The stator, which is of a generally hollow cylindrical shape may be slotted or non-slotted and preferably nested between the at least two rotors. The stator preferably includes an inner surface, an outer surface, a first end surface, and a second end surface. A plurality of polyphase windings of electrical wires are preferably toroidally-wound around the stator. The at least one permanent magnet rotor has a generally cylindrical shape which includes an inner rotor component, an outer rotor component, and a central opening extending through the inner rotor component. The inner rotor component and the outer rotor component preferably comprise a single integral rotor with the inner rotor component and the outer rotor component rotating at the same speed.

The inner rotor component includes an inner surface and an outer surface. A plurality of permanent magnets are mounted to the outer surface of the inner rotor component. The outer rotor component also has an inner surface and an outer surface with a plurality of radially polarized permanent magnets mounted to the inner surface of the outer rotor component. The stator is positioned between the permanent magnets extending outwardly from the outer surface of the inner rotor component and the permanent magnets extending inwardly from the inner surface of the outer rotor component. A first air gap is formed between the permanent magnets extending outwardly from the outer surface of the inner rotor component and the windings on the inner surface of the stator. A second air gap is formed between the permanent magnets extending inwardly from the inner surface of the outer rotor component and the windings on the outer surface of the stator.

In one aspect of the present invention, permanent magnets are preferably mounted within the core of the inner rotor component. In another aspect of the present invention, the rotor forming a dual-rotor configuration preferably comprises at least one closed end with a plurality of permanent magnets mounted to an inner surface of the at least one closed end, creating a third air gap between the permanent magnets and the end windings of the stator. In yet another aspect of the present invention, the stator preferably comprises a compressed, powdered magnet material that is formed on at least one end of the stator or formed in the core of the stator.

The unique features and advantages of the present invention include: 1) a rotor-stator-rotor structure; 2) back-to-back windings; 3) very short end windings; 4) a high main aspect ratio of diameter to length; 5) low air gap inductance; 6) high efficiency; 7) high torque density; 8) high overload capability; 9) balanced radial forces; 10) suitable for moderately high speed performance; 11) low cogging torque; and 12) low material costs.

Various other features, objects, and advantages of the invention will be made apparent to those skilled in the art from the following detailed description, claims, and accompanying drawings.

BRIEF DESCRIPTION OF THE DRAWINGS

FIG. 12A is a top plan view of a portion of a linear translational stator lamination showing a traditional slot opening design;

FIG. 12B is a top plan view of a portion of a linear translational stator lamination showing a slot opening shifted design;

FIG. 13A is a top plan view of a portion of a stator lamination showing the slot openings having the same angular width;

FIG. 13B is a top plan view of a portion of a stator lamination showing the slot openings having a different angular width;

DETAILED DESCRIPTION OF THE INVENTION

Figure 1:
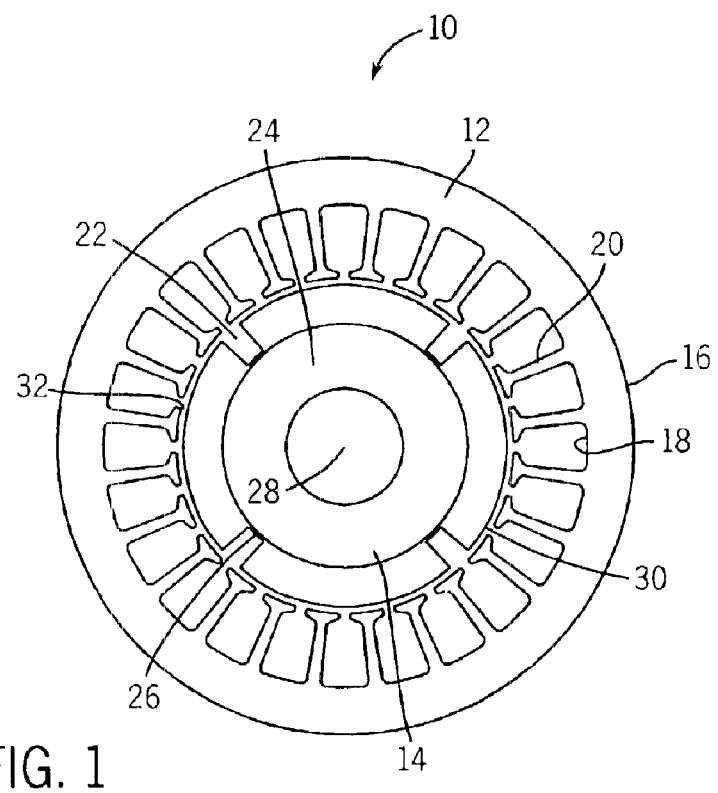
FIG. 1 is a top plan view of a prior art radial flux surface mounted slotted permanent magnet machine.

Referring now to the drawings, FIG. 1 illustrates a prior art radial-flux, surface-mounted, slotted, permanent magnet machine 10. The machine 10 includes a stator 12 and a permanent magnet rotor 14. The stator 12, which is of a generally cylindrical shape, is external to the rotor 14 and includes an outer surface 16 and an inner surface 18. The inner surface 18 includes a plurality of radially inwardly extending teeth 20 to receive polyphase windings of electrical wires wound around the teeth 20. The stator 12 further includes a central opening 22 in the middle of the stator for receiving the rotor 14 therein. The rotor 14, which is also of a generally cylindrical shape, includes a magnetically permeable core 24 with an outer surface 26 and a central opening 28 for receiving the shaft of a motor therein. A plurality of permanent magnets 30 are mounted to the outer surface 26 of the rotor 14. An air gap 32 is formed between the permanent magnets 30 and the teeth 20 of the stator. The rotor 14 magnetically interacts with the stator 12, whereby the permanent magnets 30 drive a magnetic field within the stator 12 causing a back electromagnetic force to be induced in the polyphase windings wound around the teeth 20 of the stator.

Figure 2:
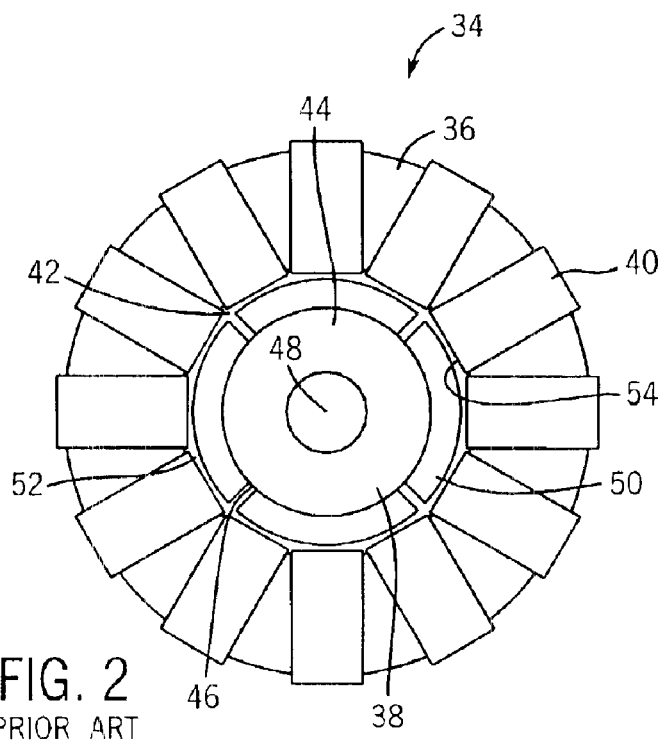
FIG. 2 is a top plan view of a prior art radial flux surface mounted non-slotted permanent magnet machine.

FIG. 2 illustrates a prior art radial-flux, surface-mounted, non-slotted, permanent magnet machine 34. This prior art machine 34 also includes a stator 36 and a permanent magnet rotor 38. The difference between this machine 34 and the machine 10 of FIG. 1, is that the stator 36 in FIG. 2 is non-slotted, meaning it does not include any radially extending teeth. The stator 36, which is of a generally cylindrical shape, is external to the rotor 38 and is formed with laminated steel with back-to-back polyphase windings 40 wound around the stator. The windings 40 are called distributed air gap windings since the windings 40 are not wound around teeth. The stator 36 further includes a central opening 42 in the middle of the stator for receiving the rotor 38 therein. The rotor 38, which is also of a generally cylindrical shape, includes a magnetically permeable core 44 with an outer surface 46 and a central opening 48 for receiving the shaft of a motor therein. A plurality of permanent magnets 50 are mounted to the outer surface 46 of the rotor 38. An air gap 52 is formed between the permanent magnets 50 and the inner windings 54 wound around the stator. The rotor 38 magnetically interacts with the stator 36, whereby the permanent magnets 50 drive a magnetic field within the stator 36 causing a back electromagnetic force to be induced in the polyphase windings 40 wound around the stator. To provide an acceptable air gap flux density, the permanent magnets 50 are Neodymium Iron Boron (NdFeB) magnets.

The prior art machines 10, 34 of FIGS. 1 and 2 posses certain disadvantages, such as, only having a single air gap and having long end windings resulting in low torque density, low efficiency and high copper losses. To increase the torque density and efficiency and decrease the copper losses of these prior art machines, the inventors of the present invention have invented a novel dual-rotor, radial-flux, toroidally-wound, permanent magnet machine.

Figure 3:
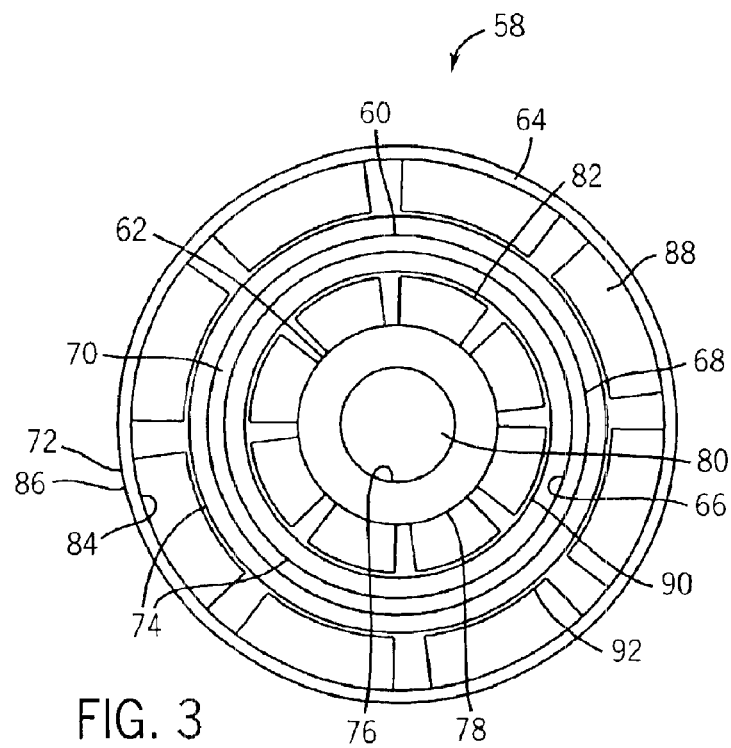
FIG. 3 is a top plan view of an embodiment of a dual-rotor, radial-flux, toriodally-wound, non-slotted, surface-mounted permanent magnet machine constructed in accordance with the present invention.

FIG. 3 illustrates an embodiment of a dual-rotor, radial-flux, toriodally-wound, non-slotted, surface-mounted, permanent magnet machine 58 constructed in accordance with the present invention. The dual-rotor, radial-flux machines of the present invention can possess a variety of embodiments based on different structure of the windings, slots, and magnet arrangements.

The machine 58 preferably includes at least one stator 60 and at least one permanent magnet rotor having inner and outer rotor components 62, 64 comprising a rotor-stator-rotor structure. The stator 60, which is of a generally hollow cylindrical shape, is nested between the at least two rotor components 62, 64. The stator 60 preferably includes an inner surface 66, an outer surface 68, a first end surface 70, and a second end surface 72. A plurality of polyphase windings 74 of electrical wires are preferably toroidally-wound around the stator 60. The windings 74 are preferably wound as back-to-back windings. The stator 60 may be formed by a plurality of stacked laminations that are connected together, or alternatively, may be formed by a magnetic powdered material that is compressed together or some combination thereof.

The at least one permanent magnet rotor has a generally cylindrical shape which preferably includes an inner rotor component 62 outer rotor component 64. The inner rotor component 62 having an inner surface 76 and an outer surface 78 with a central opening 80 extending therethrough for receiving the shaft of a motor therein. A plurality of radially polarized permanent magnets 82 are mounted to the outer surface 78 of the inner rotor component 62. The outer rotor component 64 is positioned beyond the inner rotor component 62 and the stator 60 to form the rotor-stator-rotor structure as shown in FIG. 3. The outer rotor component 64 also has an inner surface 84 and an outer surface 86. A plurality of radially polarized permanent magnets 88 are mounted to the inner surface 84 of the outer rotor component 64. The toroidally-wound stator 60 is positioned between the permanent magnets 82 extending outwardly from the outer surface 78 of the inner rotor component 62 and the permanent magnets 88 extending inwardly from the inner surface 84 of the outer rotor component 64. A first air gap 90 is formed between the permanent magnets 82 extending outwardly from the outer surface 78 of the inner rotor component 62 and the windings 74 on the inner surface 66 of the stator 60. A second air gap 92 is formed between the permanent magnets 88 extending inwardly from the inner surface 78 of the outer rotor component 64 and the windings 74 on the outer surface 68 of the stator 60. The inner rotor component 62 and the outer rotor component 64 preferably comprise a single integral rotor with the inner rotor component 62 and the outer rotor component 64 rotating at the same speed. The at least two rotor components 62, 64 magnetically interact with the stator 60, whereby the permanent magnets 82, 88 drive a magnetic field within the stator 60 causing a back electromagnetic force to be induced in the polyphase windings 74 wound around the stator. The windings 74 wound around the stator 60 may comprise toroidially-wound windings, lap windings, wave windings, or other types of windings know in the art. The windings 74 on both the inner and outer surfaces 66, 68 of the stator 60 are used for torque production so that the end windings are much shorter than the prior art structures shown in FIGS. 1 and 2. Since the working surfaces of the stator are both used, in comparison with prior art machines, the structure of the present invention allows the exploitation of a higher percentage of the stator winding for the production of torque. Therefore, the higher winding usage will result in higher efficiency and higher torque density.

The dual-rotor, radial-flux, toroidally-wound, permanent magnet machine of FIG. 3 works like two conventional machines in series. One machine on the inside and the other machine on the outside. They have the same armature current, although their back electro-magnetic force (EMF) may vary, depending on the air gap flux densities.

The permanent magnets are preferably radially magnetized, but may be magnetized using blocked, magnetic can, tapered, parallel, or interleaved methods. In addition, the permanent magnets may be comprised of ferrite magnets or rare earth magnets.

Figure 4A:
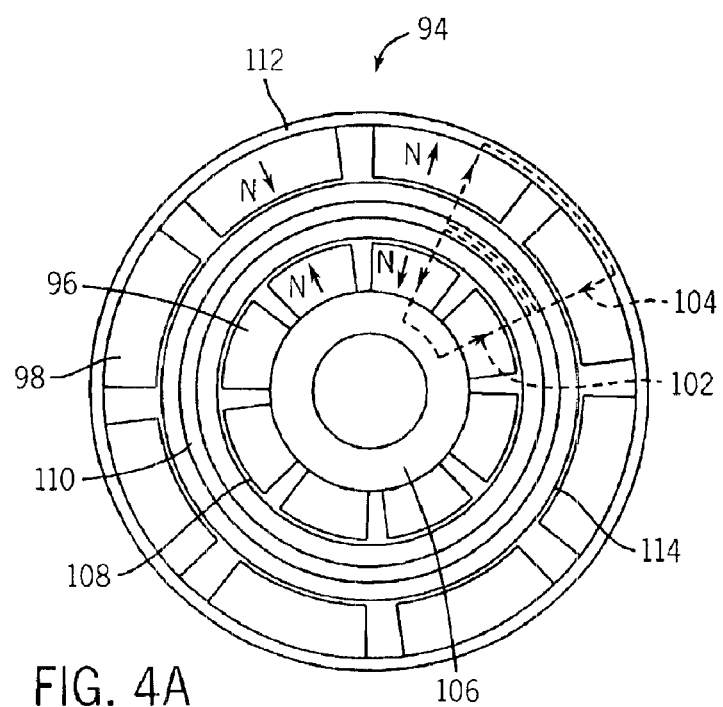
FIG. 4A is a top plan view of the magnet pole arrangement and flux distribution of the dual-rotor, radial-flux, toriodally-wound, non-slotted, surface-mounted permanent magnet machine of FIG. 3 with back-to-back windings.

FIG. 4A shows an embodiment of the flux distribution of a dual-rotor, radial-flux, toroidally-wound, non-slotted, surface-mounted permanent magnet machine 94, similar to the embodiment of FIG. 3, with inner 96 and outer 98 magnets polarized in opposite directions, resulting in a flux distribution as shown by arrows 102 and 104. The inner magnets 96 drive flux radially from the inner rotor component 106 across the first air gap 108 to the stator 110. The flux then travels circumferentially around the stator 110 and radially back across the air gap 108 to the inner rotor component 106 and through the rotor's back iron. The outer magnets 98 drive flux radially from the outer rotor component 112 across the second air gap 114 to the stator 110. The flux then travels circumferentially around the stator 110 and radially back across the second air gap 114 to the outer rotor component 112 and through the rotor's back iron.

Figure 4B:
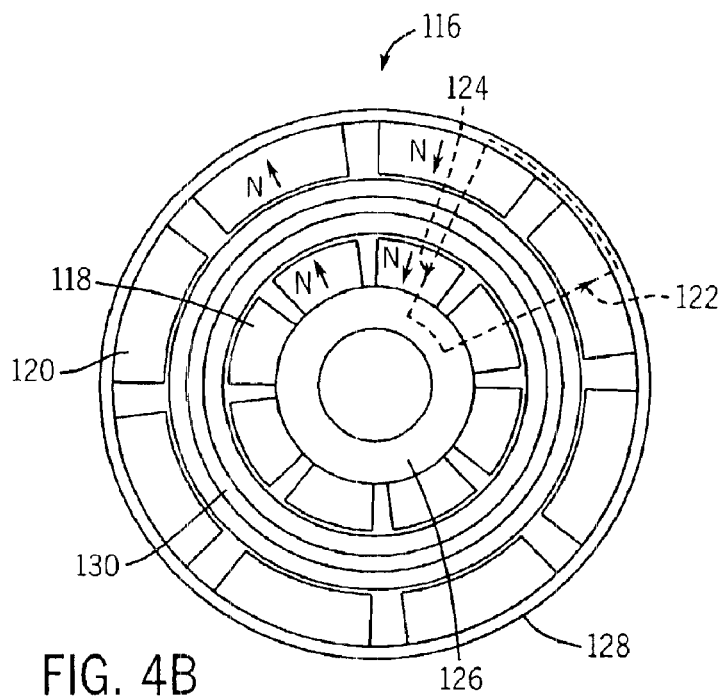
FIG. 4B is a top plan view of the magnet pole arrangement and flux distribution of the dual-rotor, radial-flux, toriodally-wound, non-slotted, surface-mounted permanent magnet machine of FIG. 3 with non-back-to-back windings.

FIG. 4B shows yet another embodiment of the flux distribution of a dual-rotor, radial-flux, toroidally-wound, non-slotted, surface-mounted permanent magnet machine 116, similar to the embodiment of FIG. 3, with inner 118 and outer 120 magnets polarized in same direction, resulting in a flux distribution as shown by arrows 122 and 124. The flux driven by the magnets 118, 120 travels radially from the inner rotor component 126 to outer rotor component 128 and then back again. There is no flux traveling along the circumference of the stator 130, implying that the stator 130 can be designed to be very thin to reduce the machine volume and improve the torque density.

Figure 5:
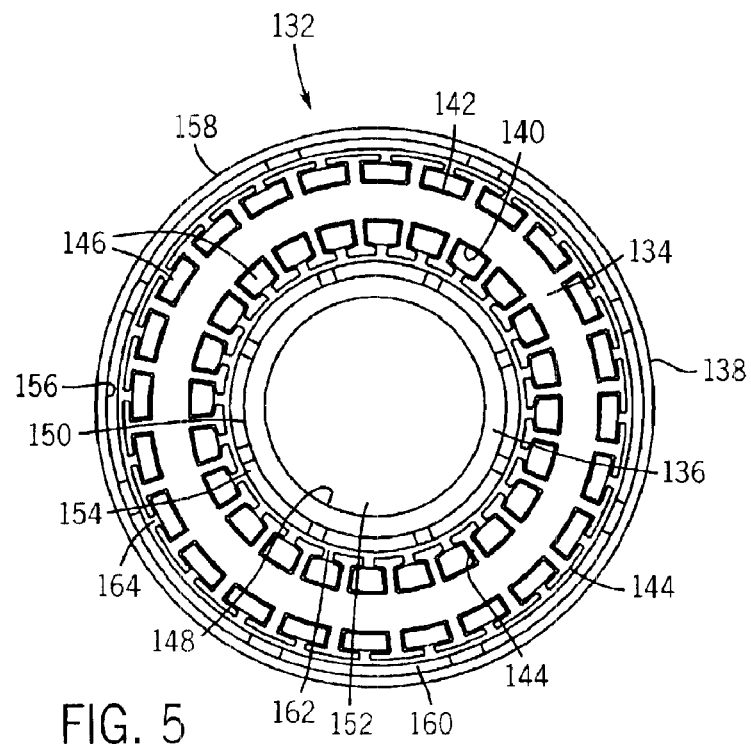
FIG. 5 is a top plan view of an embodiment of a dual-rotor, radial-flux, toriodally-wound, slotted, surface-mounted permanent magnet machine constructed in accordance with the present invention.

An embodiment of a dual-rotor, radial-flux, toroidally-wound, slotted, surface-mounted permanent magnet machine 132 is shown in FIG. 5. The machine 132 preferably includes at least one slotted stator 134 and at least one permanent magnet rotor having inner and outer rotor components 136, 138 comprising a rotor-stator-rotor structure. The stator 134, which is of a generally cylindrical shape, is nested between the at least two rotor components 136, 138. The stator 134 preferably includes an inner surface 140 and an outer surface 142 with a plurality of T-shaped teeth or slots 144 extending radially inwardly from the inner surface 140 of the stator 134 and a plurality of T-shaped teeth or slots 144 extending radially outwardly from the outer surface 142 of the stator 134. A plurality of polyphase windings 146 of electrical wires are wound around the inner 140 and outer 142 surfaces of the stator 134 between the T-shaped teeth 144. The stator 134 may be formed by a plurality of stacked laminations that are connected together, or alternatively, may be formed by a magnetic powdered material that is compressed together or some combination thereof.

The at least one permanent magnet rotor has a generally cylindrical shape which preferably includes an inner rotor component 136 and an outer rotor component 138. The inner rotor component 136 having an inner surface 148 and an outer surface 150 with a central opening 152 extending therethrough for receiving the shaft of a motor therein. A plurality of radially polarized permanent magnets 154 are mounted to the outer surface 150 of the inner rotor component 136. The outer rotor component 138 is positioned outside of the inner rotor component 136 and the stator 134 to form the rotor-stator-rotor structure as shown in FIG. 5. The outer rotor component 138 also includes an inner surface 156 and an outer surface 158. A plurality of radially polarized permanent magnets 160 are mounted to the inner surface 156 of the outer rotor component 138. The toroidally-wound stator 134 is positioned between the permanent magnets 154 extending outwardly from the outer surface 150 of the inner rotor component 136 and the permanent magnets 160 extending inwardly from the inner surface 156 of the outer rotor component 138. A first air gap 162 is formed between the permanent magnets 154 extending outwardly from the outer surface 150 of the inner rotor component 136 and the windings 146 on the inner surface 140 of the stator 134. A second air gap 164 is formed between the permanent magnets 160 extending inwardly from the inner surface 150 of the outer rotor component 138 and the windings 146 on the outer surface 142 of the stator 134.

A higher percentage of stator windings are used for torque production, resulting in higher efficiency and higher torque density than prior art structures. A higher torque density can be achieved by slotting, but the slotted structure will introduce cogging torque. The permanent magnets surface-mounted to the inner rotor could be replaced by buried magnets, which can increase the inner air gap flux density, as well as the torque density. For the outer rotor, a buried permanent magnet structure is not suitable since it may expand the machine diameter and lower the torque density.

Figure 6A:
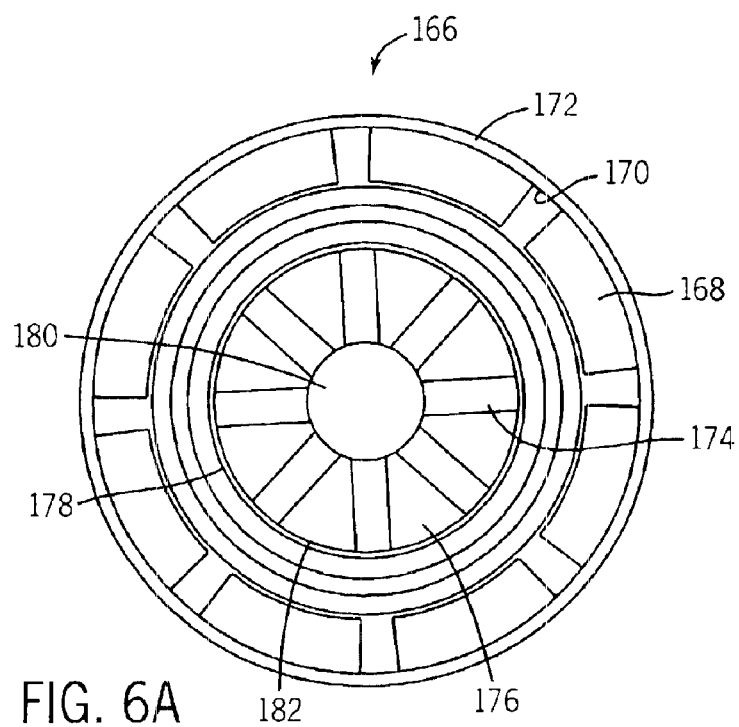
FIG. 6A is a top plan view of an embodiment of a dual-rotor, radial-flux, toriodally-wound, non-slotted, hybrid permanent magnet machine constructed in accordance with the present invention.
Figure 6B:
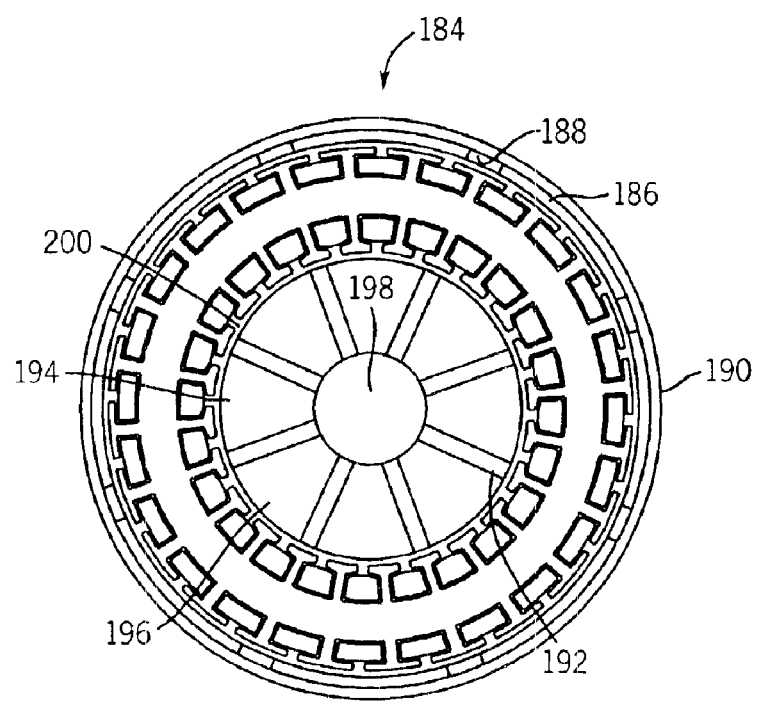
FIG. 6B is a top plan view of an embodiment of a dual-rotor, radial-flux, toriodally-wound, slotted, hybrid permanent magnet machine constructed in accordance with the present invention.

Further embodiments of hybrid, non-slotted and slotted, dual-rotor, radial-flux, toroidally-wound, permanent magnet machines 166, 184 are shown in FIGS. 6A and 6B. FIG. 6A illustrates an embodiment of a dual-rotor, radial-flux, toriodally-wound, non-slotted, permanent magnet machine 166 constructed with a plurality of permanent magnets 168 mounted to an inner surface 170 of an outer rotor component 172 and a plurality of permanent magnets 174 buried within a core 176 of an inner rotor component 178. The permanent magnets 174 buried within the core 176 of the inner rotor component 178 preferably extend radially from a central opening 180 of the inner rotor component 178 to an outer surface 182 of the inner rotor component 178. FIG. 6B illustrates an embodiment of a dual-rotor, radial-flux, toriodally-wound, slotted, permanent magnet machine 184 constructed with a plurality of permanent magnets 186 mounted to an inner surface 188 of an outer rotor component 190 and a plurality of permanent magnets 192 buried within a core 194 of an inner rotor 196. The permanent magnets 192 buried within the core 194 of the inner rotor component 196 preferably extend radially from a central opening 198 of the inner rotor component 196 to an outer surface 200 of the inner rotor component 196. As mentioned above, a buried permanent magnet structure is not suitable for the outer rotor component since it may expand the overall machine diameter and ultimately lower the torque density.

Figure 7A:
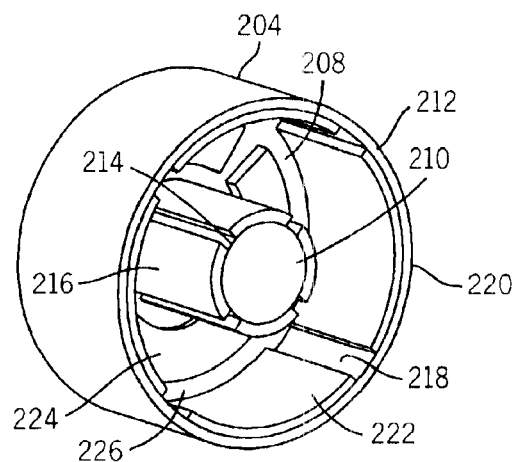
FIG. 7A is a perspective view of an embodiment of a rotor for an enhanced dual-rotor toroidally-wound, non-slotted, surface-mounted permanent magnet machine constructed in accordance with the present invention.
Figure 7B:
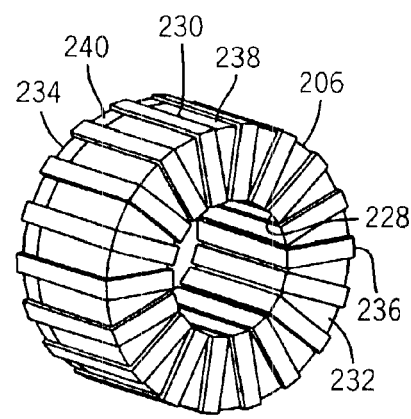
FIG. 7B is a perspective view of an embodiment of a stator for an enhanced dual-rotor toroidally-wound, non-slotted, surface-mounted permanent magnet machine constructed in accordance with the present invention.
Figure 7C:
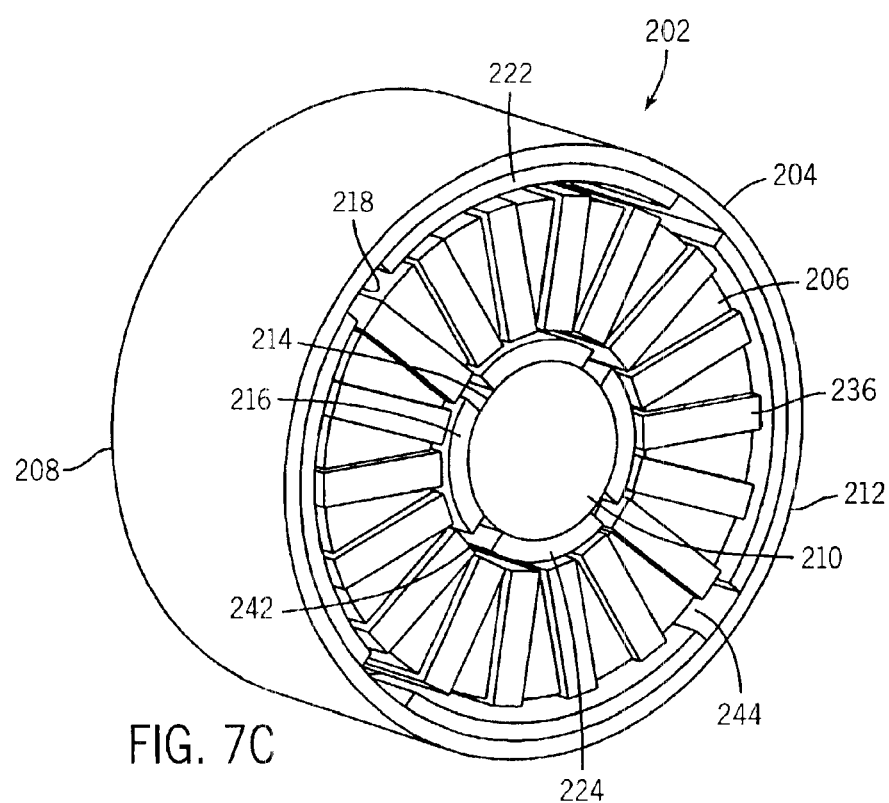
FIG. 7C is a perspective view of an embodiment of an enhanced dual-rotor, radial-flux, toroidally-wound, non-slotted, surface-mounted, permanent magnet machine combining the rotor of FIG. 7A and the stator of FIG. 7B.

In order to further improve the machine efficiency, an embodiment of an enhanced dual-rotor, radial-flux, toroidally-wound, non-slotted, surface-mounted, permanent magnet machine 202 is shown in FIGS. 7A, 7B and 7C. FIG. 7A illustrates an embodiment of a dual-rotor 204, while FIG. 7B illustrates an embodiment of a non-slotted stator 206 and FIG. 7C illustrates the enhanced dual-rotor, radial-flux, toroidally-wound, non-slotted, surface-mounted, permanent magnet machine 202 with the stator 206 of FIG. 7B rotatably mounted within the dual-rotor 204 of FIG. 7A.

The dual-rotor 204 preferably comprises a generally cylindrical shape with at least one closed end 208, forming a generally cup-shaped dual rotor structure with an inner rotor component 210 extending outwardly from the center of the at least one closed end 208 and an outer rotor component 212 extending outwardly from the periphery of the at least one closed end 208. The inner rotor component 210 preferably has an outer surface 214 with a plurality of radially polarized permanent magnets 216 mounted to the outer surface 214 of the inner rotor component 210. The outer rotor component 212 preferably has an inner surface 218 and an outer surface 220 with plurality of radially polarized permanent magnets 222 mounted to the inner surface 218 of the outer rotor component 212.

The enhancement to the dual-rotor, radial-flux, toroidally-wound, non-slotted, surface-mounted, permanent magnet machine 202 is achieved by mounting a plurality of permanent magnets 224 on the inner surface 226 of at least one closed end 208. In addition, the copper utilization percentage is enhanced, thereby increasing the efficiency.

The stator 206, also preferably comprises a generally hollow cylindrical shape. The stator 206 preferably includes an inner surface 228, an outer surface 230, a first end surface 232, and a second end surface 234. A plurality of polyphase windings 236 of electrical wires are preferably toroidally-wound around the stator 206. The stator 206 is preferably formed by a plurality of stacked laminations 238 that are connected together at one end of the stator and a magnetic powdered material 240 that is compressed together at the opposite end.

As is shown in FIG. 7C, the toroidally-wound stator 206 is positioned within an opening created by the at least one closed end 208, the inner rotor component 210 and the outer rotor component 212, between the permanent magnets 224 extending outwardly from the inner surface 226 of the at least one closed end 208, the permanent magnets 216 extending outwardly from the outer surface 214 of the inner rotor component 210, and the permanent magnets 222 extending inwardly from the inner surface 218 of the outer rotor component 212. A first air gap 242 is formed between the permanent magnets 216 extending outwardly from the outer surface 214 of the inner rotor component 210 and the windings 236 on the inner surface 228 of the stator 206. A second air gap 244 is formed between the permanent magnets 222 extending inwardly from the inner surface 218 of the outer rotor component 212 and the windings 236 on the outer surface 230 of the stator 206. A third air gap 246 is also formed between the permanent magnets 224 extending outwardly from the inner surface 226 of the at least one closed end 208 and the windings 236 on at least one end surface 232 of the stator 206. The magnetic powdered material 240 formed on one end of the stator is preferably positioned adjacent to the permanent magnets 224 extending outwardly from the inner surface 226 of the at least one closed end 208 of the stator 206.

The dual-rotor 204 magnetically interacts with the stator 206, whereby the permanent magnets 216, 222, 224 drive a magnetic field within the stator 206 causing a back electromagnetic force to be induced in the polyphase windings 236 wound around the stator. Since almost all of the windings 236 on the inner, outer and end surfaces of the stator 206 are used for torque production, the embodiment of the present invention shown in FIGS. 7A, 7B and 7C creates higher efficiency and higher torque density than the prior art.

Figure 8:
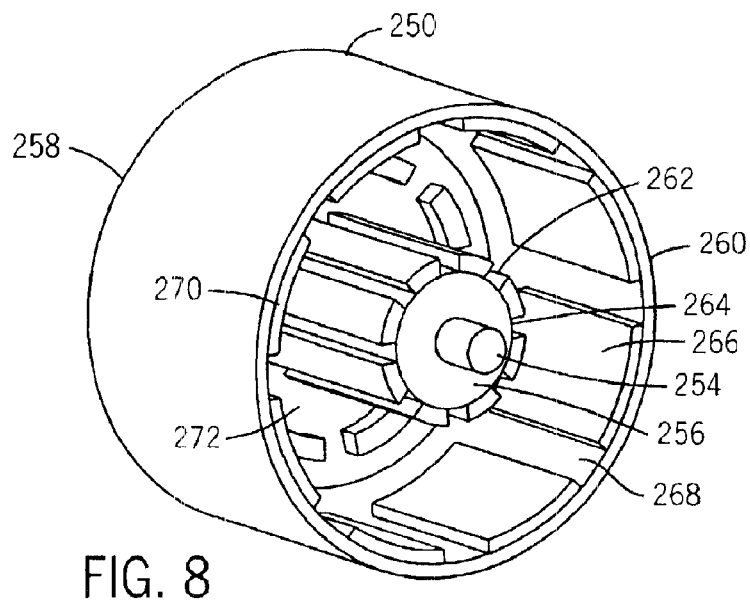
FIG. 8 is a perspective view of an embodiment of a rotor for an enhanced dual-rotor, toroidally-wound, slotted, surface-mounted permanent magnet machine constructed in accordance with the present invention.
Figure 9:
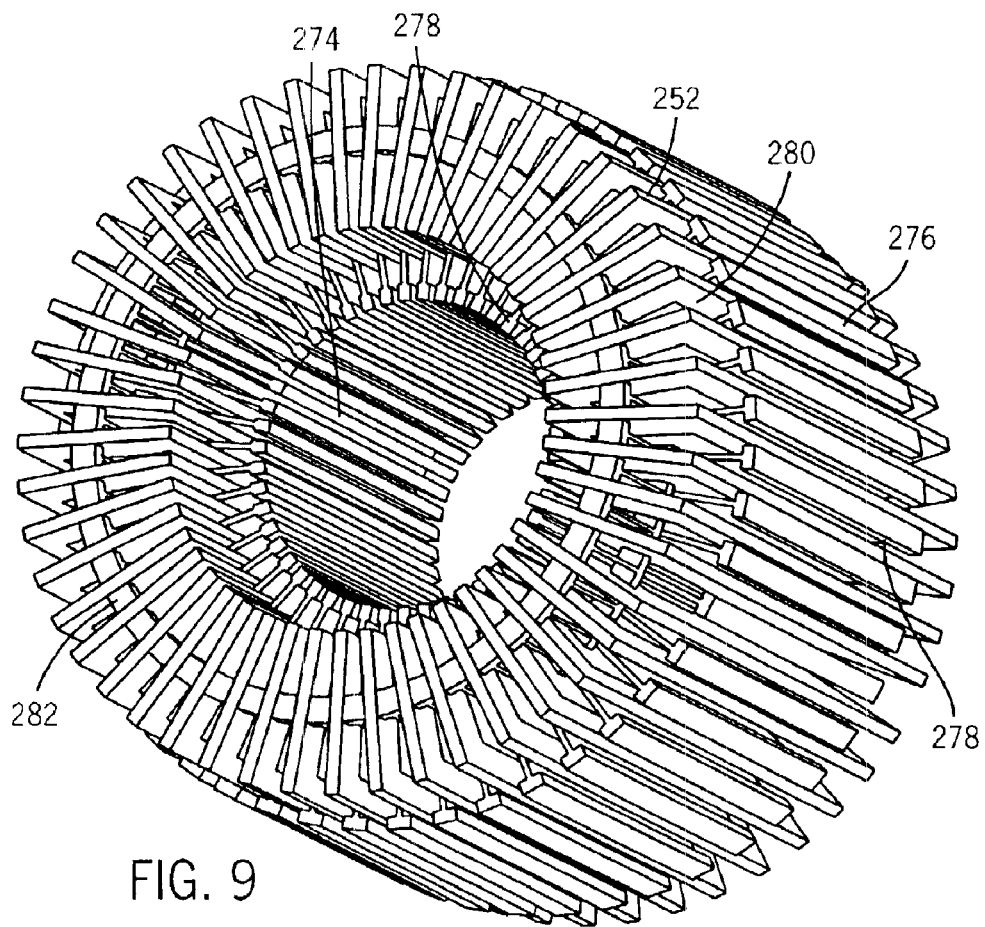
FIG. 9 is a perspective view of an embodiment of a stator for an enhanced dual-rotor, toroidally-wound, slotted, surface-mounted permanent magnet machine constructed in accordance with the present invention.
Figure 10:
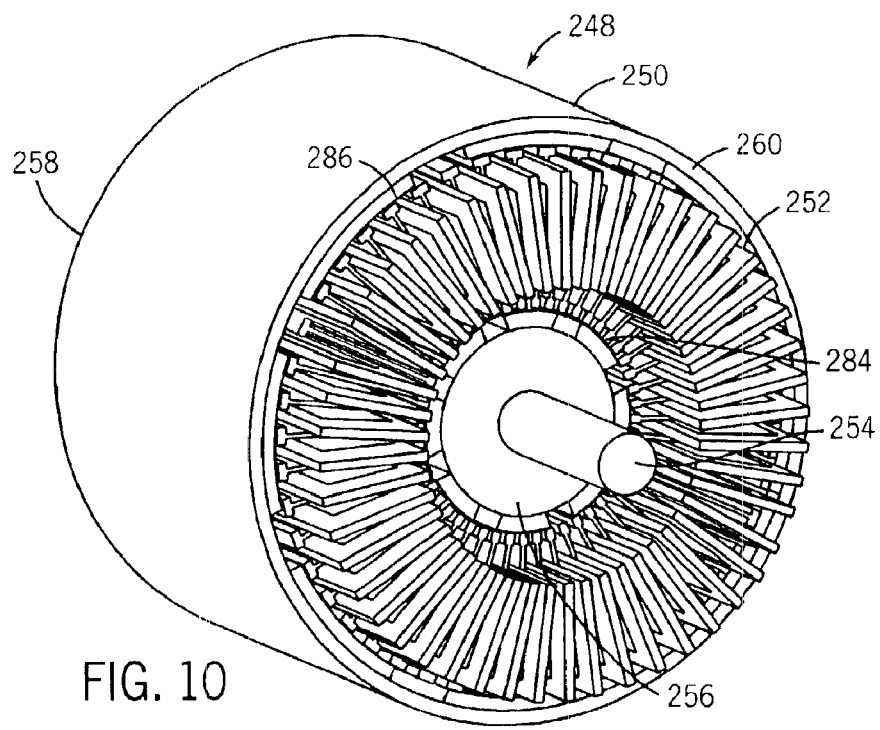
FIG. 10 is a perspective view of an enhanced dual-rotor, toroidally-wound, slotted, surface-mounted permanent magnet machine comprising the rotor of FIG. 8 and the stator of FIG. 9.
Figure 11:
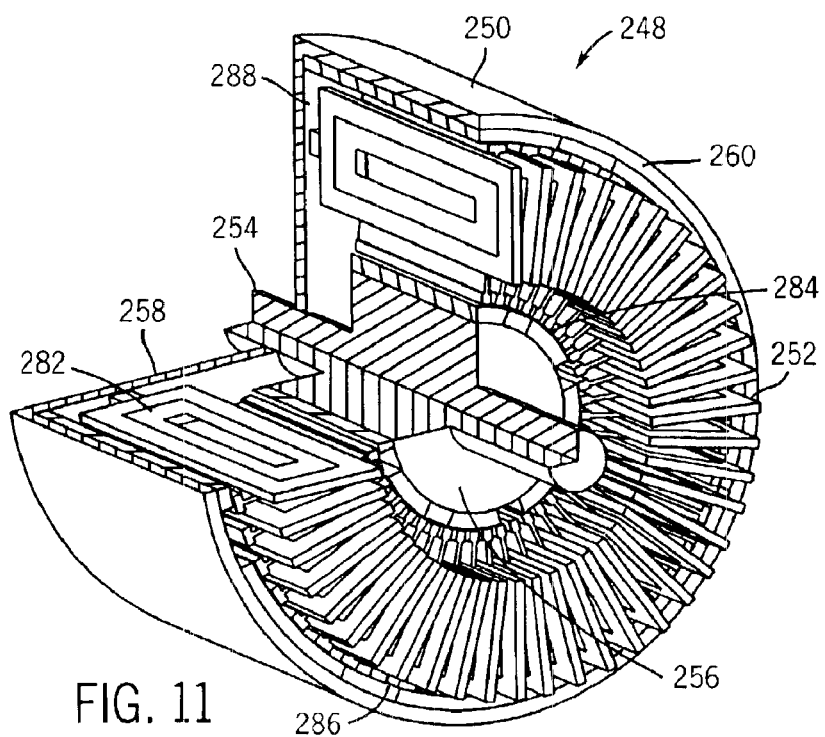
FIG. 11 is a cutaway perspective view of an enhanced dual-rotor, toroidally-wound, slotted, surface-mounted permanent magnet machine constructed in accordance with the present invention.

An embodiment of an enhanced dual-rotor, radial-flux, toroidally-wound, slotted, surface-mounted, permanent magnet machine 248 is shown in FIGS. 8-11. FIG. 8 illustrates an embodiment of a dual-rotor 250. FIG. 9 illustrates an embodiment of a slotted stator 252. FIG. 10 illustrates the enhanced dual-rotor, radial-flux, toroidally-wound, slotted, surface-mounted, permanent magnet machine 248 with the stator 252 of FIG. 9 rotatably mounted within the dual-rotor 250 of FIG. 8. FIG. 11 is a cutaway view of the machine 248 of FIG. 10.

In particular, FIG. 8 shows an enhanced dual-rotor 250 similar to the rotor of FIG. 7A with at least one closed end 258, an inner rotor component 256, and an outer rotor component 260. The inner rotor component 256 extending outwardly from the center of the at least one closed end 258 having a shaft 254 extending therethrough and a plurality of radially polarized permanent magnets 262 mounted to an outer surface 264 of the inner rotor component 256. The outer rotor component 260 extends outwardly from the periphery of the at least one closed end 258 with a plurality of radially polarized permanent magnets 266 mounted to an inner surface 268 of the outer rotor component 260. A plurality of permanent magnets 270 are also mounted to an inner surface 272 of the at least one closed end 258.

The stator 252 shown in FIG. 9 is preferably slotted. The stator 252 preferably includes an inner surface 274 and an outer surface 276 with a plurality of T-shaped teeth or slots 278 extending radially inwardly from the inner surface 274 of the stator 252 and a plurality of T-shaped teeth or slots 278 extending radially outwardly from the outer surface 276 of the stator 252. A plurality of polyphase windings 280 of electrical wires are wound around the inner 274 and outer 276 surfaces of the stator 252 between the T-shaped teeth 278. The windings 280 wound around the stator 252 may comprise toroidially-wound windings, lap windings, wave windings, or other types of windings known in the art. The stator 252 is preferably formed by a plurality of stacked laminations that are connected together and a magnetic powdered material 282 that is compressed together.

FIGS. 10 and 11 show the stator 252 nested within an opening created by the at least one closed end 258, the inner rotor component 256 and the outer rotor component 260, between the permanent magnets 270 extending outwardly from the inner surface 272 of the at least one closed end 258, the permanent magnets 262 extending outwardly from the outer surface 264 of the inner rotor component 256, and the permanent magnets 266 extending inwardly from the inner surface 268 of the outer rotor component 260. A first air gap 284 is formed between the permanent magnets 262 extending outwardly from the outer surface 264 of the inner rotor component 256 and the windings 280 on the inner surface of the stator. A second air gap 286 is formed between the permanent magnets 266 extending inwardly from the inner surface 268 of the outer rotor component 260 and the windings 280 on the outer surface of the stator. A third air gap 288 is also formed between the permanent magnets 270 extending outwardly from the inner surface 272 of the at least one closed end 258 and the windings 280 on at least one end surface of the stator. FIG. 11 shows a cross-sectional view of the magnetic powdered material 282 formed within the core of the stator 252.

In most permanent magnet machines, two types of undesired pulsating torques exist. One of them is ripple torque, produced from the harmonic content of the current and voltage waveforms in the machine. The other one, cogging torque, is caused by the interaction of the rotor magnetic flux and angular variations in the stator magnetic reluctance. Specifically, the cogging torque is caused by the variation of the magnetic energy of the field due to the permanent magnet with the mechanical angular position of the rotor. The present invention provides unique techniques for reducing cogging torque. These techniques include slot opening shifting, FIGS. 12A and 12B, varying slot opening angular width, FIGS. 13A and 13B, and varying permanent magnet angular width, FIGS. 14A and 14B.

Dual-rotor, permanent magnet machines are usually designed to have a stator laminations with inner 290 and outer 292 slot openings of equal length and direction as shown in FIG. 12A. For this type of slot opening design, the cogging torque produced by both the inner and outer air gaps are exactly in phase, so that the amplitude of the total cogging torque will be their sum. If the slot openings of the inner and outer air gaps are shifted away by half of the slot pitch, as shown in FIG. 12B, then the cogging torque will also be shifted away by half of cycle. The resulting total cogging torque is doubled in frequency and reduced in amplitude.

The slot openings on both sides of the stator can be designed to have the same angular width, as shown in FIG. 13A, in which there is no slot opening shifting. For this type of slot opening design, the cogging torque produced by both the inner and outer air gaps are in phase. Consequently, the total cogging torque for the inner and outer portions will be larger than each portion. To reduce the total cogging torque, the outside slot angular width $\alpha_{bo2}$, 300, can be designed to be smaller than the inside slot angular width $\alpha_{bo1}$, 298, since the outside slot opening arc is larger than the inside slot opening arc for the same angular widths. A design example having different angular widths, 302, 304, of the slot openings is shown in FIG. 13B. The cogging torque produced by the inner air gap will be different from the outer air gap. Therefore, the overall cogging torque will be reduced.

Figure 14A:
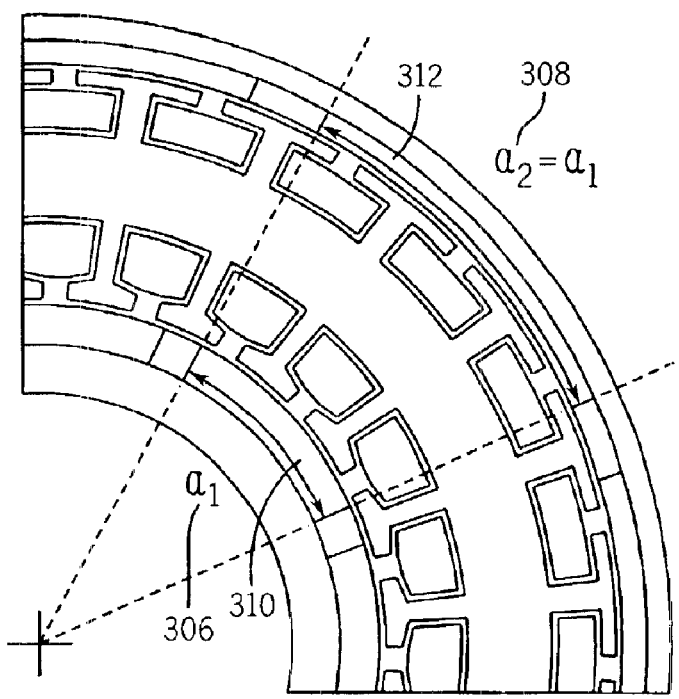
FIG. 14A is a top plan view of a portion of a dual-rotor, toroidally-wound, slotted, surface-mounted permanent magnet machine showing the permanent magnet angular width for the inner and outer magnets being the same.
Figure 14B:
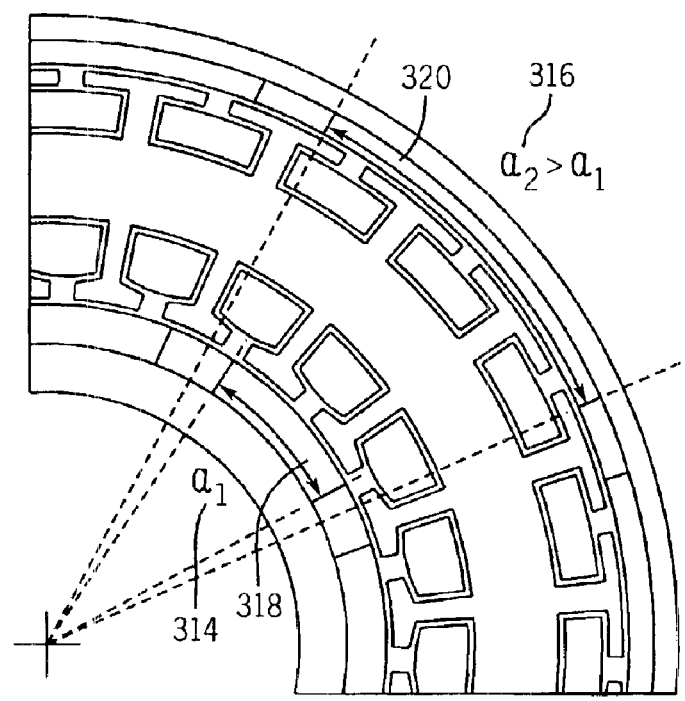
FIG. 14B is a top plan view of a portion of a dual-rotor, toroidally-wound, slotted, surface-mounted permanent magnet machine showing the permanent magnet angular width for the inner and outer magnets being different.

The two approaches discussed above, reduce the overall cogging torque by shifting away the maximum values of the inner and outer cogging torque. This objective can also be accomplished by varying the permanent magnet angular widths of the inner and outer magnets. FIG. 14A shows a design with the same permanent magnet angular widths 306, 308, for the inner 310 and outer 312 magnets, whereas FIG. 14B shows a design with different permanent magnet angular widths 314, 316, for the inner 318 and outer 320 magnets. The maximum value of the cogging torque is reduced by designing different permanent magnet angular widths for the inner and outer magnets.

Figure 15A:
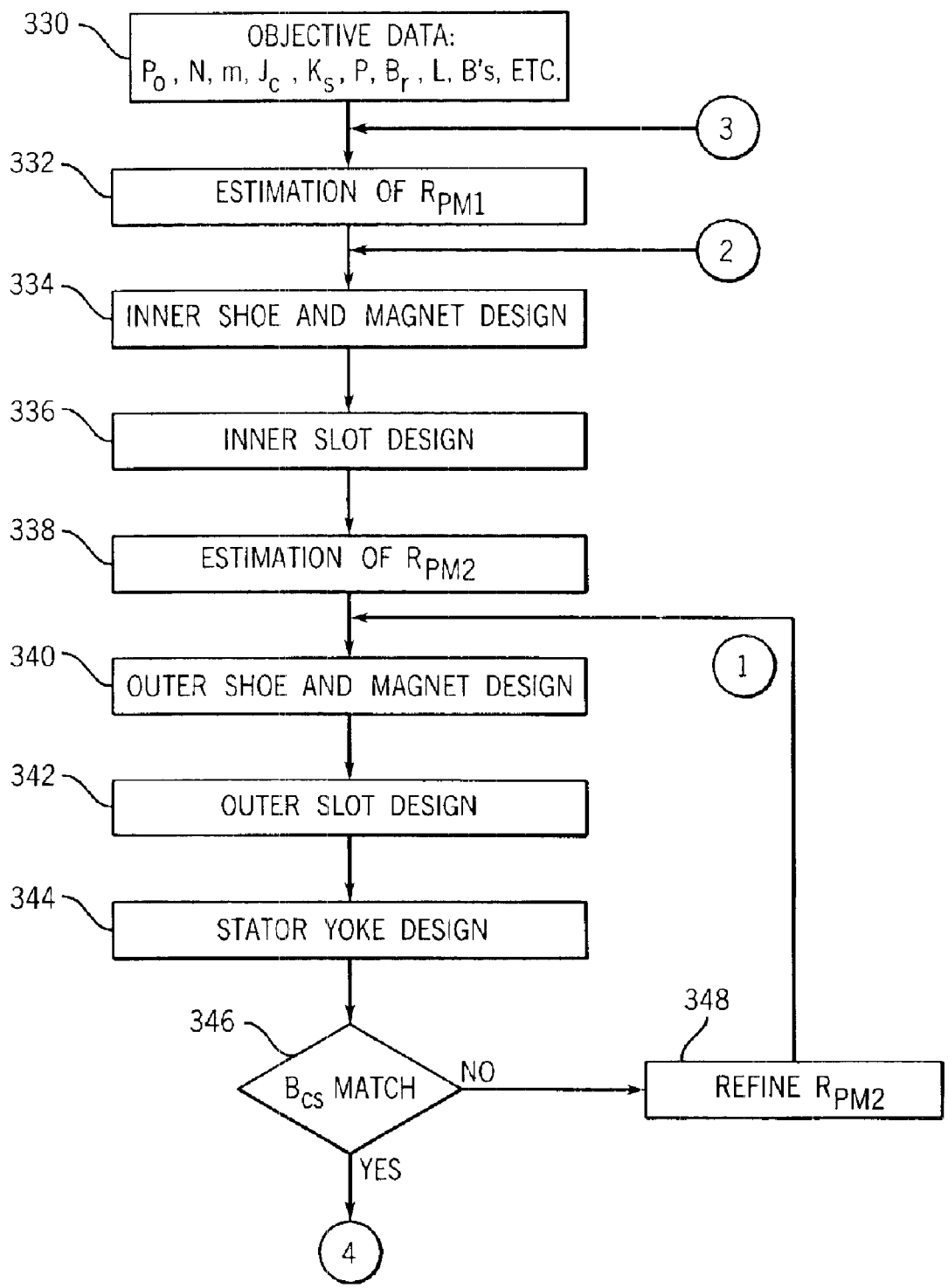
FIG. 15A is a design flowchart for a dual-rotor, radial-flux, toriodally-wound, surface-mounted permanent magnet machine.
Figure 15B:
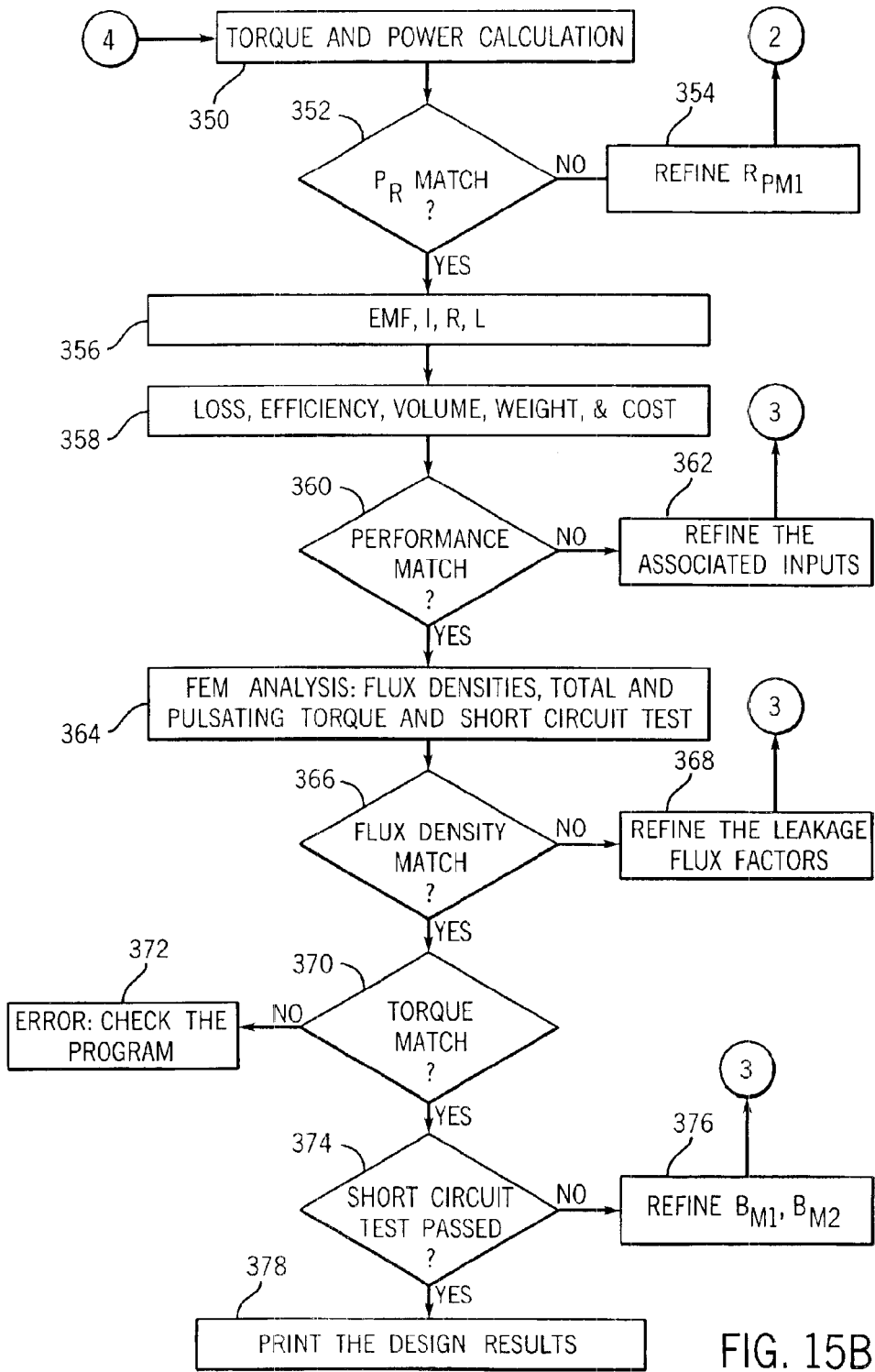
FIG. 15B is a continuation of the design flowchart of FIG. 15A.

FIGS. 15A and 15B illustrate a design flowchart implemented through a software program for designing a dual-rotor, radial-flux, toriodally-wound, surface-mounted permanent magnet machine. The first step in the design is to specify the input data 330 needed in the process per a design objective. Some fixed parameters of the input data include the power or torque P or T, rated speed N, number of phase m, area current density J, linear or circumference current density K, number of poles for inner or outer magnets P, flux densities B, effective axial length, etc. The second step is estimating the radius of the inner rotor 332. A number of calculations are performed to determine the inner stator shoe, air gap, magnetic, and inner slot parameters, 334, 336. Next the outer design is started by estimating the radius of the outer rotor 338. Calculations are then performed to determine the outer stator shoe, air gap, magnetic, and outer slot parameters, 340, 342. Once the outer machine design is completed, the calculated stator yoke flux density 344 is compared to the desired value 346. If the stator yoke flux densities do not match, the outer machine design should be repeated based on a refined estimation of the radius of the outer rotor 348. Once the stator yoke flux densities match, the power or torque output is calculated 350. The calculated power output 350 is compared to the desired value 352. If the power outputs do not match, the machine design should be repeated based on a refined estimation of the radius of the inner rotor 354. Once the power outputs match, the back EMF current, resistance and inductance of the phase is calculated 356. The performance of losses, efficiency, material volumes, weights and costs can be calculated 358.

Usually, this completes the design of a machine. However, if the designer is not satisfied with the performance 360, the original data inputs may be refined 362. In addition, a Finite Element Method (FEM) analysis may be necessary to verify the analytical result or fine tune it 364. Based upon the a Finite Element Method (FEM) analysis, the leakage flux factors may need to be updated 368 to calculate the flux distribution more accurately if the measured flux densities 366 by a Finite Element Method (FEM) analysis do not match the desired parameters. It is preferred that the input data be optimized to include parameters such as the magnetic loading, electric loading and main aspect ratio.

Figure 16:
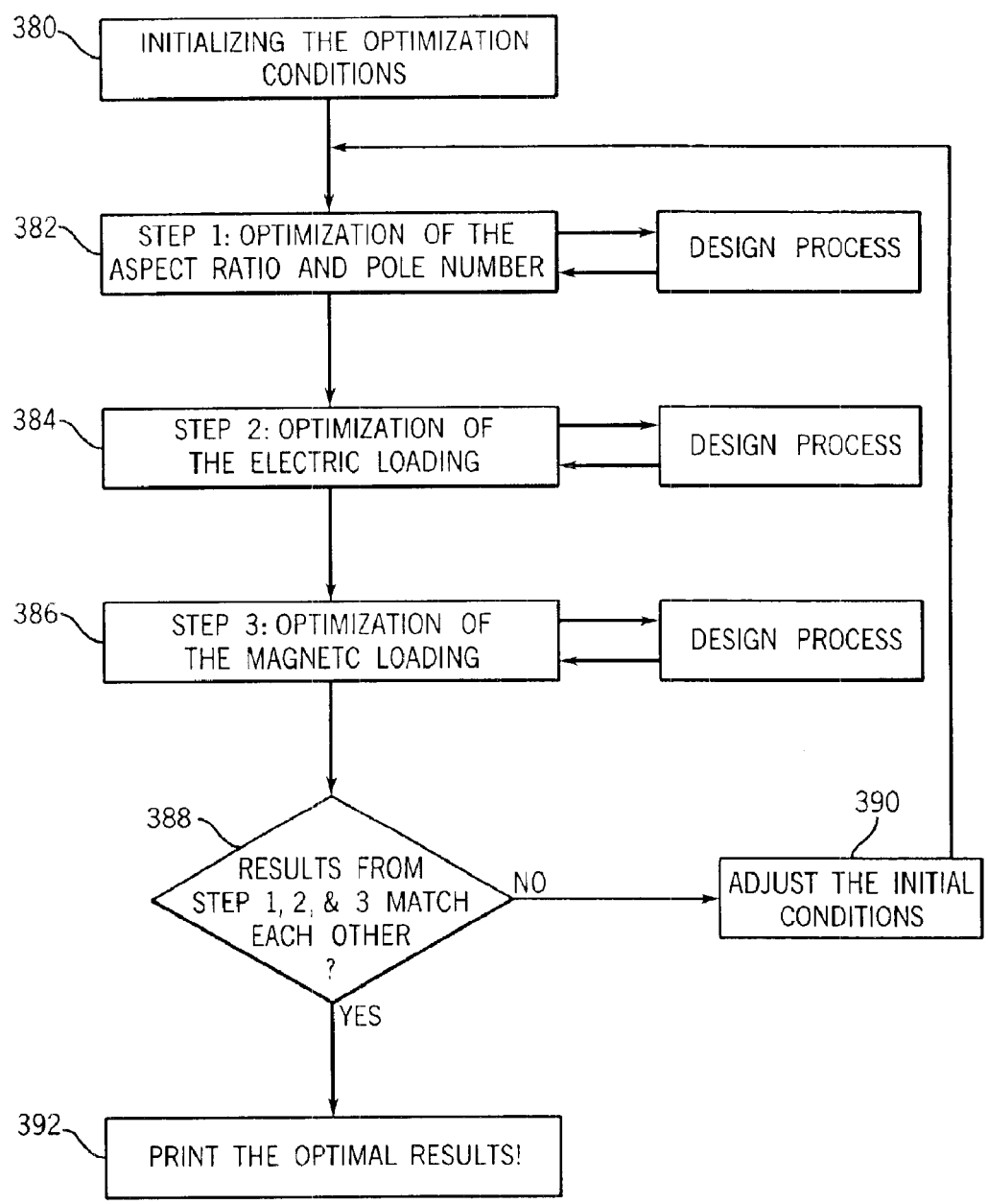
FIG. 16 is a flowchart for optimizing the aspect ratio, pole number, electric loading and magnetic loading of a dual-rotor, radial-flux, toriodally-wound, surface-mounted permanent magnet machine.

An optimization process is one of the necessary steps to achieve an optimal design. FIG. 16 shows a flowchart for optimizing the aspect ratio, pole number, electric loading and magnetic loading of a dual-rotor, radial-flux, toriodally-wound, surface-mounted permanent magnet machine. The first step is optimization of the aspect ratio and pole number 382. The next step is optimization of the electric loading 384. Next is optimization of magnetic loading 386. If the results from steps 1, 2 and 3 do not match each other 388, then the initial conditions are adjusted 390 and the optimizations are performed again. Otherwise, the optimal results may be printed out 392.

In summary, the embodiments of the present invention provides a permanent magnet machine that substantially improves efficiency due to shortened end windings and boosts the torque density by doubling the working portion of the air gap as well as optimizing the machine aspect ratio. The material cost is also kept low by using ferrite magnets. The machine embodiments of the present invention are proved to be suitable for the moderately high speed. If the inner surface-mounted magnets are changed to the buried type, the speed can be even higher. In addition, the cogging torque and associated noise is reduced to a very low level at no addition cost or penalty by using the unique techniques described above.

While the invention has been described with reference to preferred embodiments, it is to be understood that the invention is not intended to be limited to the specific embodiments set forth above. For example, the permanent magnets mentioned in each of the embodiments of the present invention are preferably radially magnetized, but may be magnetized using blocked, magnetic can, tapered, parallel, interleaved, or other methods. In addition, the permanent magnets may be comprised of ferrite magnets or rare earth magnets. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

We claim:

1. A permanent magnet machine comprising:
    at least one permanent magnet rotor having a generally cylindrical shape with an inner rotor component and an outer rotor component;
    at least one stator having a generally hollow cylindrical shape positioned within an opening between the inner and outer components of the permanent magnet rotor;
    a plurality of polyphase windings of electrical wires wound around the at least one stator; and
    a means for reducing cogging torque.

2. The machine of claim 1, wherein the at least one stator includes an inner surface, an outer surface, a first end surface, and a second end surface.

3. The machine of claim 1, wherein the at least one stator is non-slotted.

4. The machine of claim 1, wherein the at least one stator is slotted forming slot openings having an angular width.

5. The machine of claim 1, wherein the at least one permanent magnet rotor is an integral dual-rotor with the inner rotor component and the outer rotor component rotating at the same speed.

6. The machine of claim 5, wherein the inner rotor component includes an inner surface and an outer surface, and a central opening extending through the center of the inner rotor component.

7. The machine of claim 6, further comprising a plurality of permanent magnets mounted to the outer surface of the inner rotor component, the permanent magnets having an angular width.

8. The machine of claim 7, wherein the plurality of permanent magnets are radially polarized.

9. The machine of claim 7, wherein the plurality of permanent magnets are parallelly polarized.

10. The machine of claim 7, wherein the plurality of permanent magnets are ferrite magnets.

11. The machine of claim 7, wherein the plurality of permanent magnets are rare earth magnets.

12. The machine of claim 5, wherein the outer rotor component includes an inner surface and an outer surface with a plurality of permanent magnets mounted to the inner surface of the outer rotor component, the permanent magnets having an angular width.

13. The machine of claim 12, wherein the plurality of permanent magnets are radially polarized.

14. The machine of claim 12, wherein the plurality of permanent magnets are parallelly polarized.

15. The machine of claim 12, wherein the plurality of permanent magnets are ferrite magnets.

16. The machine of claim 12, wherein the plurality of permanent magnets are rare earth magnets.

17. The machine of claim 7, further comprising a first air gap formed between the permanent magnets extending outwardly from the outer surface of the inner rotor component and the windings on the inner surface of the stator.

18. The machine of claim 12, further comprising a second air gap formed between the permanent magnets extending inwardly from the inner surface of the outer rotor component and the windings on the outer surface of the stator.

19. The machine of claim 4, wherein the slot openings are shifted as the means for reducing cogging torque.

20. The machine of claim 4, wherein the angular width of the slot openings are varied as the means for reducing cogging torque.

21. The machine of claim 7, wherein the angular width of the permanent magnets are varied as the means for reducing cogging torque.

22. The machine of claim 1, wherein the at least one stator is non-slotted with a plurality of magnets mounted within the rotor.

23. The machine of claim 1, wherein the at least one stator is slotted with a plurality of magnets mounted within the rotor.

24. The machine of claim 1, wherein the at least one stator is non-slotted with a plurality of magnets mounted to at least one end of the at least one permanent magnet rotor.

25. The machine of claim 1, wherein the at least one stator is slotted with a plurality of magnets mounted to at least one end of the at least one permanent magnet rotor.

26. The machine of claim 1, wherein the at least one stator is partly formed of a compressed powdered magnetic material.

27. The machine of claim 1, wherein the plurality of polyphase windings are toroidally-wound windings.

28. The machine of claim 1, wherein the plurality of polyphase windings are lap windings.

29. The machine of claim 1, wherein the plurality of polyphase windings are wave windings.

30. A hybrid permanent magnet machine comprising:
at least one permanent magnet rotor;
at least one stator nested within an opening formed between an inner rotor component and an outer rotor component of the at least one permanent magnet rotor creating a rotor-stator-rotor structure;
a plurality of permanent magnets mounted within the core of the inner rotor component, the permanent magnets having an angular width, and a plurality of permanent magnets mounted to an inner surface of the outer rotor component, the permanent magnets having an angular width;
a plurality of polyphase windings of electrical wires wound around the at least one stator; and
a means for reducing cogging torque.

31. The machine of claim 30, wherein the at least one stator is non-slotted.

32. The machine of claim 30, wherein the at least one stator is slotted forming slot openings having an angular width.

33. The machine of claim 30, wherein the plurality of polyphase windings are toroidally-wound windings.

34. The machine of claim 30, wherein the plurality of polyphase windings are lap windings.

35. The machine of claim 30, wherein the plurality of polyphase windings are wave windings.

36. The machine of claim 12, wherein the annular width of the permanent magnets are varied as the means for reducing cogging torque.

37. The machine of claim 32, wherein the slot openings are shifted as the means for reducing cogging torque.

38. The machine of claim 32, wherein the angular width of the slot openings are varied as the means for reducing cogging torque.

39. The machine of claim 30, wherein the angular width of the permanent magnets are varied as the means for reducing cogging torque.

\* \* \* \* \*